(12) United States Patent
Nayar

(10) Patent No.: US 10,583,487 B2
(45) Date of Patent: Mar. 10, 2020

(54) METHOD OF PRODUCING ALLOYED METALLIC PRODUCTS

(71) Applicant: TAT Technologies LLC, St. Mary's, PA (US)

(72) Inventor: Harbhajan S. Nayar, New Providence, NJ (US)

(73) Assignee: TAT Technologies LLC, Saint Marys, PA (US)

( * ) Notice: Subject to any disclaimer, the term of this patent is extended or adjusted under 35 U.S.C. 154(b) by 747 days.

(21) Appl. No.: 14/957,721

(22) Filed: Dec. 3, 2015

(65) Prior Publication Data

US 2016/0158844 A1     Jun. 9, 2016

Related U.S. Application Data

(60) Provisional application No. 62/087,994, filed on Dec. 5, 2014.

(51) Int. Cl.
| | |
|---|---|
| *B22F 3/00* | (2006.01) |
| *B22F 3/16* | (2006.01) |
| *B22F 9/04* | (2006.01) |
| *B22F 1/00* | (2006.01) |
| *C21D 1/06* | (2006.01) |
| *C21D 1/26* | (2006.01) |
| *C21D 1/42* | (2006.01) |
| *C21D 1/74* | (2006.01) |
| *C23C 8/02* | (2006.01) |
| *C23C 8/20* | (2006.01) |
| *C23C 8/24* | (2006.01) |
| *C23C 8/30* | (2006.01) |
| *C23C 8/26* | (2006.01) |
| *C23C 8/22* | (2006.01) |
| *C23C 8/32* | (2006.01) |
| *B22F 3/02* | (2006.01) |

(52) U.S. Cl.
CPC ............ *B22F 3/162* (2013.01); *B22F 1/0059* (2013.01); *B22F 9/04* (2013.01); *C21D 1/06* (2013.01); *C21D 1/26* (2013.01); *C21D 1/42* (2013.01); *C21D 1/74* (2013.01); *C23C 8/02* (2013.01); *C23C 8/20* (2013.01); *C23C 8/22* (2013.01); *C23C 8/24* (2013.01); *C23C 8/26* (2013.01); *C23C 8/30* (2013.01); *C23C 8/32* (2013.01); *B22F 1/0062* (2013.01); *B22F 2003/023* (2013.01); *B22F 2998/10* (2013.01); *Y02P 10/253* (2015.11)

(58) Field of Classification Search
CPC ....... B22F 3/162; B22F 3/31; B22F 2003/023
USPC .......................................................... 419/27
See application file for complete search history.

(56) References Cited

U.S. PATENT DOCUMENTS

| | | | | |
|---|---|---|---|---|
| 3,645,728 A | * | 2/1972 | Hrinevich, Jr. ........... | B22F 5/10 419/36 |
| 5,985,208 A | * | 11/1999 | Zedalis ................ | B22F 3/1021 419/36 |
| 6,322,746 B1 | * | 11/2001 | LaSalle .............. | A63B 53/0487 419/6 |

* cited by examiner

*Primary Examiner* — Mark A Chapman
(74) *Attorney, Agent, or Firm* — Lauren McKenzie Stokes; Penn State Law Intellectual Property Clinic

(57) ABSTRACT

A method of producing a finished essentially 100% dense homogenous alloyed metallic product. First, a metal powder is provided comprised of particles with each particle having a predetermined alloy content. Next, the metal powder is blended with a mixture of a lubricant and a binder to form a composite powder. That composite powder is then compacted in a compacting die at room temperature to form a green part. The lubricant and binder are then removed by heating the green part to at least a first temperature profile in a confined atmosphere with a predetermined dew point profile. Next, the remaining green part is heated to a second temperature higher than the first temperature and with predetermined dew point and $H_2/H_2O$ ratio in a furnace atmosphere to remove surface oxides from the part. Finally, the part is densified into a finished or near net shape homogenous alloyed product.

23 Claims, No Drawings

METHOD OF PRODUCING ALLOYED METALLIC PRODUCTS

REFERENCE TO RELATED CASES

The present patent application is based upon and hereby claims priority to provisional patent application Ser. No. 62/087,994, filed Dec. 5, 2014 entitled "Method of Producing Alloyed Metallic Products" and the disclosure of that provisional patent application is incorporated herein in its entirety by reference.

FIELD OF THE INVENTION

This invention relates to a powdered material processing multi step process to produce essentially 100% dense alloyed metallic products where all the key alloying elements are homogenously & uniformly distributed on a micro scale throughout the product mass. More specifically it relates to the production of essentially 100% dense Carbon Steels, High Strength Low Alloy Steels, Low Alloy Steels and Medium Alloy High Performance steels (as defined by the American Iron and Steel Institute) finished or near-net shape products starting with relatively inexpensive pre-alloyed powdered materials of the final desired alloy composition suitable for heat treat to provide high strength and high performance steel products using relatively lower amount of overall energy and cost.

BACKGROUND OF THE INVENTION

A large variety of high performance 100% dense products of a variety of shapes weighing few grams to many pounds in weight and in carbon, low and medium alloy steel compositions are made via forging and/or machining of cut preforms from 100% dense bars or ingots made from molten mass of low to medium alloy grades of a large variety of steels (series 1000 to 9000H to HS grades), stainless steels & many other alloys. Many similar and other products are also made via casting of molten alloys into desired shape, size and composition especially with higher levels of graphite in otherwise an alloyed composition. The low to medium alloy grades normally have Fe as the majority constituent and relatively smaller amounts of alloying ingredients of one or more of C, Si, Mn, Cr, Ni, Mo, V, Cu, Zr, Mb, Ti etc (each of the alloying ingredient when added is from very low to up to about 4%). These alloying elements are reasonably uniformly and homogenously dispersed in the alloy steels on a micro scale. These alloying elements help to increase strength, various other mechanical properties, wear resistance and/or corrosion resistance. They can be further heat treated to further increase some of these properties. These products are used in automobiles, motor cycles, bicycles, bearings, farm machinery, lawn & garden, aerospace, mining, home appliances and just about all major industries. The major disadvantages of going from molten alloy to ingots/bars to finished product via forging and/or machining are: low to vary low material utilization (leading to significant added cost); many forming & annealing operations (leading to significant added cost) and possibility of impurities appearing as "stringers" leading to lower dynamic mechanical properties such as fatigue life. These routes are also very energy intensive.

Powdered Metallurgy route to make some of these products has also been used. Just to mention three significantly different examples (1 to 3 below):

EXAMPLE 1

Metal Injection Molding

Fine fully pre-alloyed powders (less than 20 micron in diameter) of stainless steel are mixed with up to about 12% by weight (about 50% by volume) of a special binder—a mixture of 2 to 3 organic binders such as fatty wax, Polypropylene, Polypropylene glycol, Stearic Acid etc. The mixture is then injection molded to a size and shape somewhat larger than the desired finished product at temperature above the melting point of the binders to a "tooth paste" viscosity. Once parts are molded as "green", the binders are removed and burnt through a combination of chemical and thermal processes. The debinded molded part is sintered at relatively very high temperature (above 2350 F) in a "pusher" furnace to form the 97-100% dense product. The main disadvantages of this rout are: 1. It is limited to making relatively small parts from 1 to about 100 gm 2. Starts with very fine powder (100% below 325 mesh) that is relatively very expensive; uses large amount (50% by volume) of organic binders that are removed very slowly prior to sintering. The sintering cycle is long and energy intensive to take the green part from about 50% density to close to 100% density. All these steps add significantly to the cost of the finished product. Generally density is closer to 97-99% and not 100%. In order to get 100% density, the parts are usually Hot Isostatic Pressed (HIP'd). Because one needs to go from about 50% density to close to 100% density, the dimensional control is less. Over all it has a small niche market.

EXAMPLE 2

Powder Forged

Annealed Fe powder of medium size (100% −100 mesh or below 150 microns size with about 35% of this is −325 mesh or below 44 Microns) is premixed with Copper powder (1-3%), MnS powder (0.5 to 1%), Graphite ( ) 0.5-0.7%) and lubricant like Ethylene Bis-Stearmide (0.6-0.8%). The premixed powders are compacted under 30 to 40 TSI pressure to provide a "green" compact of about 85% or more of the theoretical density. The annealed condition of iron is necessary to make the powder easily compressible to give both the desired high green density of about or above and high green strength to make it easily transferable to the next operation. The "green" parts are delubed and then sintered in a furnace at about 2050 F and then hot forged to give 100% density. Its disadvantages are: Fe powder is annealed prior to mixing with other ingredients that adds to cost significantly. The powder size is coarser than in example 1 but still high starting cost. Its response to hear treat is limited as the powder is not pre-alloyed so needs longer time during sintering for Cu to diffuse into Fe particles. It is a special application. This route is used to make connecting rods for the automotive industry.

EXAMPLE 3

Similar to Example 2 except instead of Cu and MnS powders, master alloy powders of FeMn, FeCr, FeSi, FeV etc are mixed with to the annealed Fe powder of medium particle size along with Graphite (C) powder to give the final average composition of low to medium alloy steels that are suitable for heat treat after sintering and forging operation. The sintering is typically done at temperatures and times significantly higher than that in example 2 above in order to diffuse elements like Mn, Si, Cr, Ni, V, Mo etc from the master alloy particles into the Fe powder particles. Higher temperature and time is required to sufficiently diffuse the alloying ingredients into the Fe matrix. This diffusion requirement become somewhat easier to carry out by having smaller Fe powder size but that leads to significantly increased cost. This route's disadvantages are: 1. Higher starting powder cost because of Fe powder is annealed and still on the fine side 2. Alloying ingredients like Si, Mn, Cr, and V etc in the master alloy as admixed particles have high affinity for O2 and even though they are added as master alloys and not as pure elements, they still have high oxidation potential that requires highly reducing atmosphere and higher temperatures during sintering and very protective atmosphere during transferring from sintering furnace to the forging press. 3. The sintering temperature has to be relatively high (above 2250 F) and sintering time has to be on the long side to allow the alloying ingredients to fully diffuse into the iron to form a uniform homogenous distribution of all alloying elements on a micro scale. All in all it leads to high cost and high energy consumption and for this reason not widely adopted.

The present invention is another but totally different of the Powder Metallurgy route which has advantages over both the conventional machining or forging or casting route and the Powder Metallurgy routes exemplified by the above three examples.

a. The new invention route is made of the following individual but highly interdependent process steps that result in relatively lower cost and lower energy used to produce fully pre-alloyed essentially 100% dense steel products with relatively higher dynamic mechanical properties:

1. Starting with low-medium alloy steel powder that is NOT annealed, is relatively coarse & 100% pre-alloyed where ALL the desired alloying elements like Mn, Si, Cr, V, Ni, Mo, Cu etc. and C are uniformly distributed in a homogenous way on a micro scale in each & every powder particle. This pre-alloyed un-annealed powder is relatively coarse (100% −40 mesh or below 420 micron size with no more than about 15% −325 mesh or below 44 microns). This is expected to be the least expensive starting pre-alloyed raw material in powder form with the least possible surface oxide content because of coarser particle size and relatively much less oxidation potential for a given low or medium alloy steel composition because ALL alloying elements that have high affinity for O2 are in a pre-alloyed and diluted form in each iron particle. It requires relatively less energy to produce the coarser powder with a higher yield when the powder is made via atomization process. It is preferred that powder particle shape is relatively ir-regular instead of spherical when powder is atomized. This will aid in lowering the total amount of lubricants and binders (step 2) and compacting pressure (step 3) needed to reach the desired minimum green strength at the end of step 3. It is also preferred that total amount of particle surface oxides is as low as possible. All above mentioned features when combined lead to overall lower cost and lower energy used in the starting metal powder material.

2. Blending the fully pre-alloyed, coarse and un-annealed powder with 0.5 to 3.5% by weight mixture of organic lubricant (like Ethylene Bis-Stearmide) and/or one or more of the binders like Polypropylene, Polypropylene Glycol, Stearic acid or come other organic thermo plastic powder. The mixture of organic lubricant(s) and/or binder(s) is expected to give satisfactory compacting tool life (step 3) and the green strength needed by the end of step 3 and to transfer the "green" part to step 4. This level of admixed organic lubricant & binder mixture wall also ensure no oxidation of the pre-alloyed metal powder during the early stage in step 4 and aid in oxide reduction in the later part of Step 4. In some compositions, it is likely that one of the lubricant(s) and/or binder(s) will be used to surface coat the particles before mixing to ease compacting (step 3) and provide the required minimum green strength after compacting (step 3) for transferring parts to step 4.

3. Compacting the pre-alloyed powder admixed with the lubricant-binder mixture in a compacting die at room temperature or slightly above the room temperature (150-400 F) using a hydraulic or mechanical press to a desired shape, size and weight to give a "green" part of a density below 85% (based on the metallic portion of the "green" part) with green strength sufficient for handling the part to the next step 4. If need be the inside surfaces of the compacting die can be spray coated with a lubricant to reduce the wear and provide ease in compaction and ejection of the part from the die. Lower green density (less than 85%) provides sufficient open interconnected channels for lubricant-binder vapors to escape fast during the early portion of the next step 4 and allow highly reducing atmosphere to do its oxide reducing function more efficiently during the middle and later portion of the next step 4. It will help the next step 4 to be more efficient in reaching its objectives in a shorter time, at lower cost and requiring lower level of energy usage.

4. Thermal Processing of "Green Part" is done preferably using a continuous conveyor or pusher furnace made up of three independent but interconnected sections in the same one furnace:

A. Preparation Section: Here the temperature in the immediate vicinity of the "green" part is very quickly brought to above about 1,000 F in the furnace atmosphere that has a high dew point above about +80 F for a time sufficient to melt, vaporize, flush and destroy (burn) a major portion of the admixed organic powders coming out of the parts as vapors. This fast temperature rise to above 1,000 F combined with high dew point significantly accelerates the melting & vaporization of the organic lubricant-binder and helps to burn the lubricant-binder vapors without any soot formation and harmful emissions escaping to the outside of the furnace via the front opening of the furnace. All this is done without oxidizing the part itself.

B. Transition Section: Gradually reduce the dew point in the atmosphere to below 0 F and gradually increase the temperature surrounding the part to about 1600 F to ensure all the organic lubricant-binder mass is removed and vaporized from the entire part. Not only there will be no oxidizing of the part in any way in the B section of the furnace but some reduction of the particle surface oxides has taken place by carbon to the lubricant/binder mixture or any admixed graphite at these intermediate temperatures.

C. Strength Development & Oxide Reduction Section: In this section the temperature is quickly or in 2 steps raised to 1700-2100 F depending upon the alloy composition and the admixed ingredients in the starting powder mixture under a highly oxide reducing furnace atmosphere with dew point below −30 F and a H2/H2O ratio above 200 for a time sufficient to impart some additional strength to the part and make sure that practically all the particles surface oxides have been reduced to a lowest possible level. Part's strength must be sufficient for subsequent handling. Part must also be essentially oxide free. Part density is still below about 85% of theoretical density.

For a given composition of the starting pre-alloyed powder and admixed ingredients, the three interconnected sections of the furnace combined with part density below about of its theoretical density lead to essentially oxide free part that is sufficiently strong to easily take it to step 5 and beyond for essentially 100% density and any other heat treat or surface treat step. It is all accomplished at a relatively lower cost and with minimum possible energy usage.

5. Essentially 100% Densification: There are three (3) options to get from less than about 85% density at the end of step 4 to essentially 100% density:

Option 1: Let parts cooled down to room temperature under protective atmosphere after step 4C above. The parts are re-compacted, coined or forged at room temperature or higher temperature up to about 1000 F to density above 85% preferably above 90% and re-sintered at a temperature typically higher than that temperature actually used in step 4C for sufficient time under a protective atmosphere to achieve density approaching 100%. Parts are cooled down to room temperature in a protective atmosphere. Essentially 100% dense parts can be further heat treated, surface hardened (Carburizing, Nitriding, Carbonitriding) or surface treated or surface coated to further improve some of its properties.

Option 2: Let parts cooled down to room temperature under protective atmosphere after step 4C above, surface coated with a protective material like Graphite, induction heated to the forging temperature between 1400 and 2000 F for forging. Immediately after that parts are forged at a temperature between 1400 and 2000 F to essentially 100% density using appropriate lubricants normally used in such operations in air or protective atmosphere depending upon the composition of the part. After being forged, parts are dropped while still hot into a quench tank with appropriate fluid and circulation for heat treat purposes with high enough cooling rate to provide optimum strength and other properties. Faster is the cooling rate, higher will be the strength and surface hardness. Parts are tempered at 300-900 F to relieve some residual stresses in the part as a result of intense quenching. Parts can be further surface treated or coated or modified to bring out some additional properties.

Option 3: Soon after step 4C above, move the parts into a "holding" section of the furnace under a protective atmosphere at a pre-set temperature between 1400 and 2000 F required by the next forging step and then using a robot, one part at a time is transferred to the forging die in air or under a protective atmosphere depending upon the starting composition or final application. The part may also be spray coated with some protective material as it is being transferred for the forging step. Part is forged at a temperature between 1400 and 2000 F to essentially 100% density using appropriate lubricants normally used in such operations in air or protective atmosphere depending upon the composition of the part. After being forged, parts are dropped while still hot into a quench tank with appropriate fluid and circulation for heat treat purposes with high enough cooling rate to provide optimum strength and other properties. Faster is the cooling rate, higher will be the strength and surface hardness. Parts are tempered at 300-900 F to relieve some residual stresses in the part as a result of intense quenching. Parts can be further surface treated or coated or modified to bring out some additional properties.

b. Variation to the new invention outlined in "a" above: Same as "a", except in step 3, the die is heated to a temperature in the range of 150-400 F to improve the lubrication between the powder mass and the die & punches and increase green strength.

c. Another variation to the new invention as outlined in "a" above: Same as "a", except the C (Carbon), when desired, is not present in the pre-alloyed powder (step 1) but is admixed instead as free Graphite (C) (up to 1%) along with other lubricants and binders with otherwise the pre-alloyed powder in the desired amount in step 2 under "a".

d. Another variation to the new invention outlined in "a" above: Same as "a" except part (up to 0.5%) of total carbon desired in the finished product is pre-alloyed with powder (Step 1 in "a" above) and the balance up to about 1% is admixed as free Graphite (C) as in "c" above e. Another variation to the new invention as outlined in "c" above: Same as "c" except the die is heated to a temperature range of 130-400 F to improve the lubrication between the powder mass and the die & punches and increase green strength.

f. Another Variation to the new invention as outlined in "a" above except the pre-alloyed powder is tempered by heating to 300-900 F in a protective atmosphere prior to step 2.

Key differences between the various routes to get to 100% dense low-medium alloy steel products in the range of 1 gram to 10,000 grams per piece are believed to be:

|  | Machining/ Forging Bar stock | Powder Metallurgy Example 1 | Powder Metallurgy Example 3 | New INVENTION "a" to "f" above |
|---|---|---|---|---|
| Material Utilization | Low | Medium | Med.-High | Very High |
| Alloying Elements | Uniform | Very Uniform | Uniform | Very Uniform |
| Start material | Bar Stock | Fine powder | Med. Powder | Coarser Powder |
| Start Condition | Annealed | Not annealed | Annealed | Not Annealed |
| Start Mat'l cost | Low | Very High | Medium | Low |
| Weight Range (gm) | 100-50,000 | 1-100 | 50-1,000 | 50-50,000 |
| Static Mech. Props. | High | Moderate | Moderate | High |
| Dyn. Mech. Props. | Good | N/A | Good | Very Good |
| Oxidation issues | None | None | High | Low-Moderate |
| Energy Consumed | Very High | Very High | Medium | Very Low |
| Finished Cost/piece | High | Very High | High | Low |

Those skilled in the art will readily recognize numerous adaptations and modifications which can be made to the method of producing alloyed metallic products of the present invention which will result in an improved method, yet all of which will fall within the scope and spirit of the present invention as defined in the following claims Accordingly, the invention is to be limited only by the following claims and their equivalents.

What is claimed is:

1. A method of producing a finished essentially 100% dense and homogenous alloyed metallic product comprising the steps of:
    providing a metallic powder wherein said metal powder is substantially comprised of un-annealed particles that are between 44 microns and 420 microns in size and wherein each of the un-annealed particles have substantially the same predetermined alloy content;
    blending the metal powder with a pre-determined amount of lubricant and binder mixture to form a composite powder;
    compacting the composite powder in a compacting die to form a green part of a density below about 85% based on the metallic portion of the green part;
    removing the lubricant and binder mixture and surface oxides by a removal process comprises: (a) heating the green part to at least a first predetermined lower temperature profile in a confined atmosphere at a predetermined high dew point profile essentially removing all the organic solid lubricant and binder mixture, and (b) heating the green part to a second predetermined high temperature profile in a confined atmosphere at predetermined low dew point and high $H_2/H_2O$ ratio profile in to remove essentially all surface oxides from the green art; and
    densifying the part via compaction into a finished or near net shape homogenous alloyed product that is essentially 100% of the theoretical density of the alloy to form a finished essentially 100% dense and homogenous alloyed metallic product.

2. The method of claim 1 wherein the step of blending the metal powder with the lubricant and binder mixture comprises blending the lubricant and binder in powder form.

3. The method of claim 2 wherein the step of blending the metal powder with the lubricant and binder mixture comprises blending a lubricant and a binder in powder form wherein the combined weight percent of the lubricant and the binder powders is less than 3.5% by weight or 20% by volume.

4. The method of claim 1 wherein the step of blending the metal powder with a lubricant and the binder mixture comprises: blending at least one lubricant and binder and coating the metal powder.

5. The method of claim 1 wherein the step of providing a metal powder comprises providing a metal powder that is −40 mesh.

6. The method of claim 1 wherein the step of providing a metal powder comprises providing a metal powder that is no more than 10 percent −325 mesh size.

7. The method of claim 1 further including a step of tempering the metal powder by heating it to between 300-900 F under a protective atmosphere prior to the step of blending the metal powder with a predetermined amount of a mixture of a solid lubricant and a binder mixture to form a composite powder.

8. The method of claim 1 wherein the step of compacting the metal powder comprises compacting the composite at room temperature to a desired shape green part to a density less than 85 percent of the alloy.

9. The method of claim 1 wherein the step of compacting the composite powder comprises compacting the composite powder in a compacting die, wherein said compacting die is heated to a temperature of between about 150 F and 400 F.

10. The method of claim 1 wherein the step of removing the lubricant and binder mixture comprises placing the green part in a furnace and rapidly raising the temperature to above about 1000 F in an atmosphere that has a dew point above +80 F and subsequently gradually reducing the dew point to below OF while gradually increasing the temperature to about 1600 F.

11. The method of claim 1 wherein the step of heating the remaining green part to a second predetermined temperature is between 1700-2050 F and the heating is carried out in a highly oxide reducing atmosphere with a $H_2/H_2O$ ratio higher than 200 and dew point below −30 F.

12. The method of claim 1 wherein the step densifying the part with a density below 85% is comprised of re-compacting or coining or forging at a temperature up to about 1000 F to a density above 85% followed by re-sintering at a temperature above 2100 F to approach 100% density to generate a sintered part.

13. The method of claim 12 further including the step of heat treating, surface hardening, or surface coating the sintered part.

14. The method of claim 12 further comprising the step of surface hardening the alloyed product via carburizing, nitriding, or carbonitriding.

15. The method of claim 1 wherein the step of densifying the part with a density below 85% is comprised of induction heating the part to a forging temperature between 1400 and 2000 F and then forging the part as a temperature between 1400 and 2000 F to essentially 100% density and predetermined dimensions.

16. The method of claim 15 further comprising contacting the alloyed product with a fluid to cool at a high rate.

17. The method of claim 15 further including the step of tempering the forged and heat treating finished product at a temperature between about 300 F and 900 F.

18. The method of claim 1 wherein the step of densifying the part with a density below 85% is comprised of furnace heating the part to a forging temperature between 1400 and 2000 F and then forging the part at a temperature between 1400 and 2000 F to essentially 100% density.

19. The method of claim 18 further comprising contacting the alloyed product with a fluid to cool at a high rate.

20. The method of claim 18 further including the step of tempering the forged and heat treating finished product at a temperature between about 300 and 900 F.

21. The method of claim 1 wherein the step of providing a metal powder comprises providing a metal powder wherein the particles of each has a predetermined alloy content void of carbon.

22. The method of claim 1 wherein the step of blending the metal powder with a predetermined amount of the lubricant and binder mixture comprises blending a predetermined amount of carbon (as graphite) admixed with the lubricant and binder mixture.

23. The method of claim 22 wherein the predetermined amount of carbon (as graphite) is an amount of 1% carbon (as graphite) of the composite powder.

* * * * *